United States Patent
Heiskanen et al.

(10) Patent No.: US 10,913,759 B2
(45) Date of Patent: Feb. 9, 2021

(54) METHOD OF PURIFYING LIGNIN BY SUBJECTING A SLURRY COMPRISING LIGNIN TO AN ELECTRIC FIELD

(71) Applicant: Stora Enso OYJ, Helsinki (FI)

(72) Inventors: Isto Heiskanen, Imatra (FI); Kaj Backfolk, Lappeenranta (FI); Valentas Gaidelis, Vilnius (LT); Jonas Sidaravicius, Vilnius (LT)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/516,281

(22) PCT Filed: Sep. 30, 2015

(86) PCT No.: PCT/IB2015/057478
§ 371 (c)(1),
(2) Date: Mar. 31, 2017

(87) PCT Pub. No.: WO2016/051351
PCT Pub. Date: Apr. 7, 2016

(65) Prior Publication Data
US 2017/0305949 A1    Oct. 26, 2017

(30) Foreign Application Priority Data
Oct. 3, 2014    (SE) ........................... 1451174

(51) Int. Cl.
*C07G 1/00*    (2011.01)
*D21C 11/00*    (2006.01)
*C08H 7/00*    (2011.01)

(52) U.S. Cl.
CPC ............ *C07G 1/00* (2013.01); *C08H 6/00* (2013.01); *D21C 11/00* (2013.01); *D21C 11/0007* (2013.01)

(58) Field of Classification Search
CPC ..................................... D21C 11/0007
See application file for complete search history.

(56) References Cited

U.S. PATENT DOCUMENTS 3,757,426 A    9/1973    Candor et al.
4,584,057 A    4/1986    Rowe et al.
(Continued)

FOREIGN PATENT DOCUMENTS

CN    1459420 A    3/2003
CN    103100304 A    5/2013
(Continued)

OTHER PUBLICATIONS

Vlogger et al. (J. High Resol. Chromatogr. vol. 21, 1998, p. 3-10) (Year: 1998).*
(Continued)

*Primary Examiner* — Liam J Heincer
(74) *Attorney, Agent, or Firm* — Greer, Burns & Crain, Ltd.

(57) ABSTRACT

The present invention relates to a process for purifying, such as salt/ion depletion, and/or ash reduction, and/or sulphur removal, and/or free sugar depletion, and/or VOC depletion or fractionating, preferably by using dewatering, of a slurry comprising a lignin or lignin derivative or a combination thereof. A lignin or lignin derivative obtainable from said process and uses thereof are also disclosed.

20 Claims, 11 Drawing Sheets

1 - the sample chamber (camera), 2 - membranes, 3 - perforated plates, 4 anode chamber (camera), 5 cathode chamber (camera), 6 - sides with water outlets.

(56) References Cited

U.S. PATENT DOCUMENTS

| | | | |
|---|---|---|---|
| 5,536,384 A * | 7/1996 | Thompson | B01D 61/44 204/522 |
| 5,725,748 A | 3/1998 | Burkhard et al. | |
| 8,133,355 B2 | 3/2012 | Pulliainen et al. | |
| 9,447,540 B2 * | 9/2016 | Heiskanen | B01D 61/56 |
| 9,447,541 B2 * | 9/2016 | Heiskanen | B01D 61/56 |
| 2005/0016870 A1 | 1/2005 | Berrak et al. | |
| 2005/0199499 A1 | 9/2005 | Berrak et al. | |
| 2012/0055797 A1 * | 3/2012 | Dermoune | C02F 1/469 204/553 |
| 2014/0073774 A1 | 3/2014 | Heiskanen et al. | |
| 2014/0088301 A1 * | 3/2014 | Heiskanen | B01D 61/56 536/56 |
| 2014/0357847 A1 * | 12/2014 | Wallmo | C08H 6/00 530/507 |
| 2015/0075738 A1 * | 3/2015 | Wimby | C08H 8/00 162/16 |
| 2015/0203522 A1 * | 7/2015 | Valkonen | D21C 11/0007 530/500 |

FOREIGN PATENT DOCUMENTS

| | | |
|---|---|---|
| CN | 103332842 B | 10/2013 |
| JP | 2013527339 A | 6/2013 |
| JP | 2014514427 A | 6/2014 |
| WO | 9102700 A | 3/1991 |
| WO | 2005033024 A1 | 4/2005 |
| WO | WO-2012156880 A1 * | 11/2012 ............ B01D 61/56 |
| WO | 2013003941 A1 | 1/2013 |

OTHER PUBLICATIONS

Svensson, Minimizing the sulphur content in Kraft lignin, Degree Project, ECTS 30.0 At STFI-Packforsk Stockholm, 2008 (Year: 2008).*

Serdobol'Skii E.N. et al "Electroosmotic transfer method for studying the electrokinetic properties of lignin sludge at the Baikal'sk pulp and paper mill", In: Izvestiya Sibirskogo Otdeleniya Akademii Nauk SSSR, Seriya Khimicheskikh Nauk, 1986, vol. 5, pp. 136-139, DN 106:34883, AN 1987:34883.

Prabhu A.M., Basu S. "Studies on electrodialytic recovery and decatinization of lignin from kraft black liquor" In: Proceedings of the 7th international symposium on fresh water from the sea, 1980, vol. 2, pp. 425-431, ISSN 0378-2298.

International Search Report and Written Opinion for PCT/IB2015/057478, dated Jan. 26, 2016.

Iizuka, Teruaki, Separation of Spent Sulfate Liquor (KP Black Liquor) Components by Electrodialysis Process, Kitanihon Paper Mgs. Co., Ltd.

Gözde Gözke et al, "Electrofiltration of Biopolymers", Food Engineering Reviews, vol. 2, No. 2, pp. 131-146. 2010.

Xiaowei, He, Carbohydrate Functional Materials, China Light Industry Press, Jan. 2007, ISBN 978-7-5019-5753-8/TS 3344.

* cited by examiner

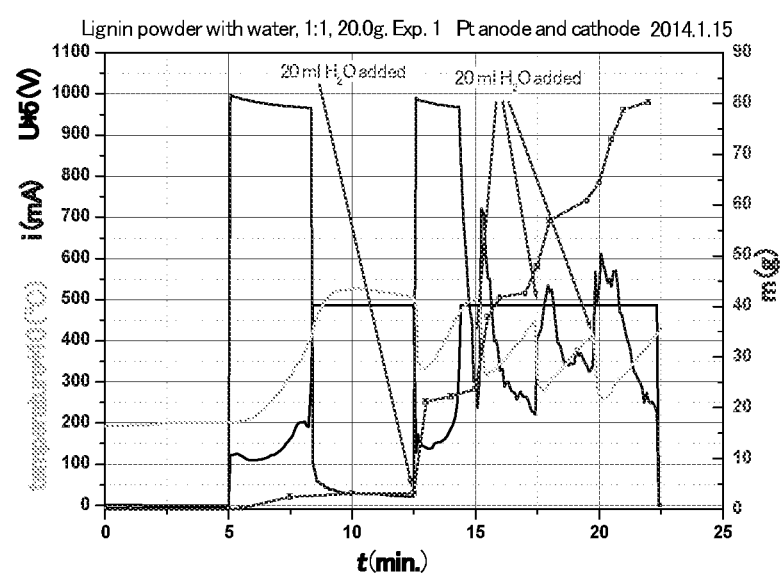
Fig. 1. The results of the experiment 1.

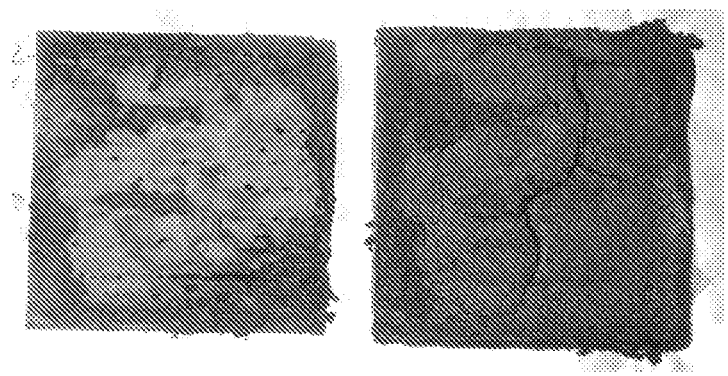
Fig 2. The anode filter (left) and the cakes anode side (right) in the experiment 1.

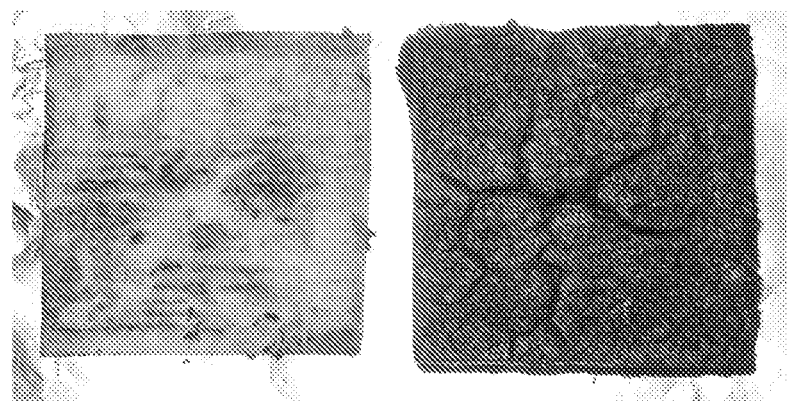
Fig 3. The cathode filter (left) and the cakes cathode side (right) in the experiment 1.

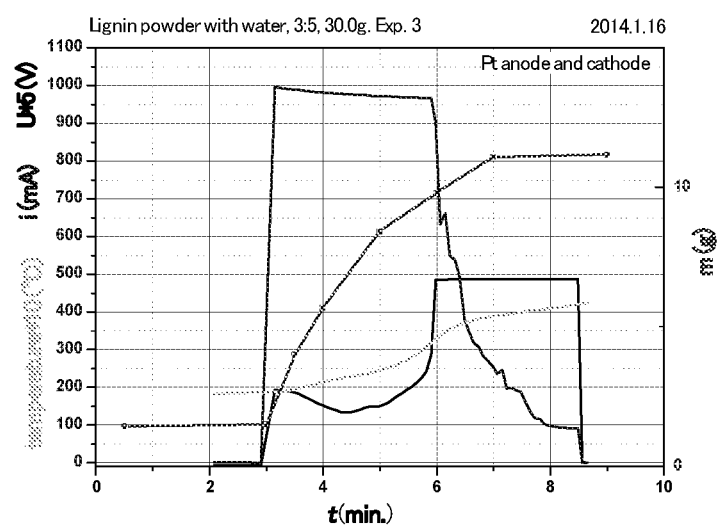
Fig. 4. The results of the experiment 2.

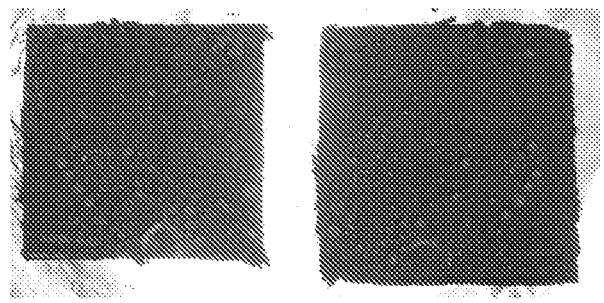
Fig 5. The anode filter (left) and the cakes anode side (right) in the experiment 2.

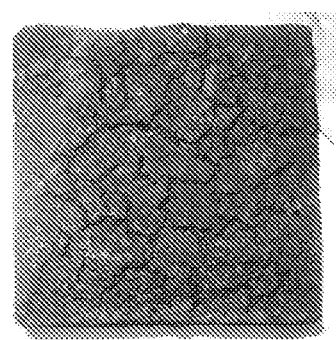
Fig 6. The cathode side of the cake in the experiment 2.

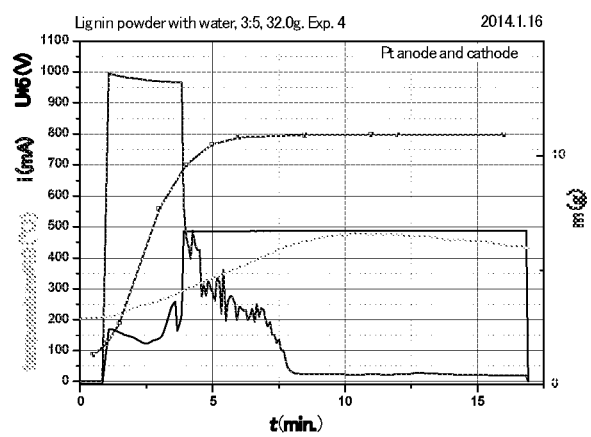
Fig. 7. The results of the experiment 3.

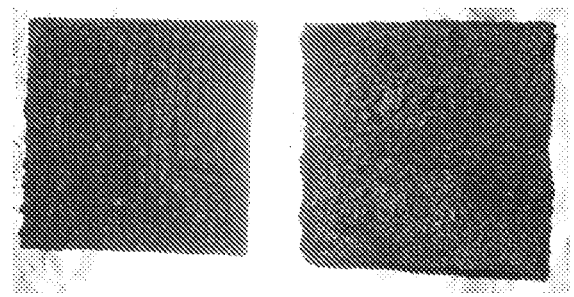
Fig 8. The anode filter (left) and the cakes anode side (right) in the experiment 3.

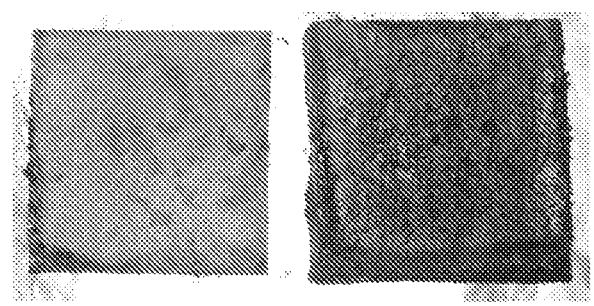
Fig 9. The cathode filter (left) and the cakes cathode side (right) in the experiment 3.

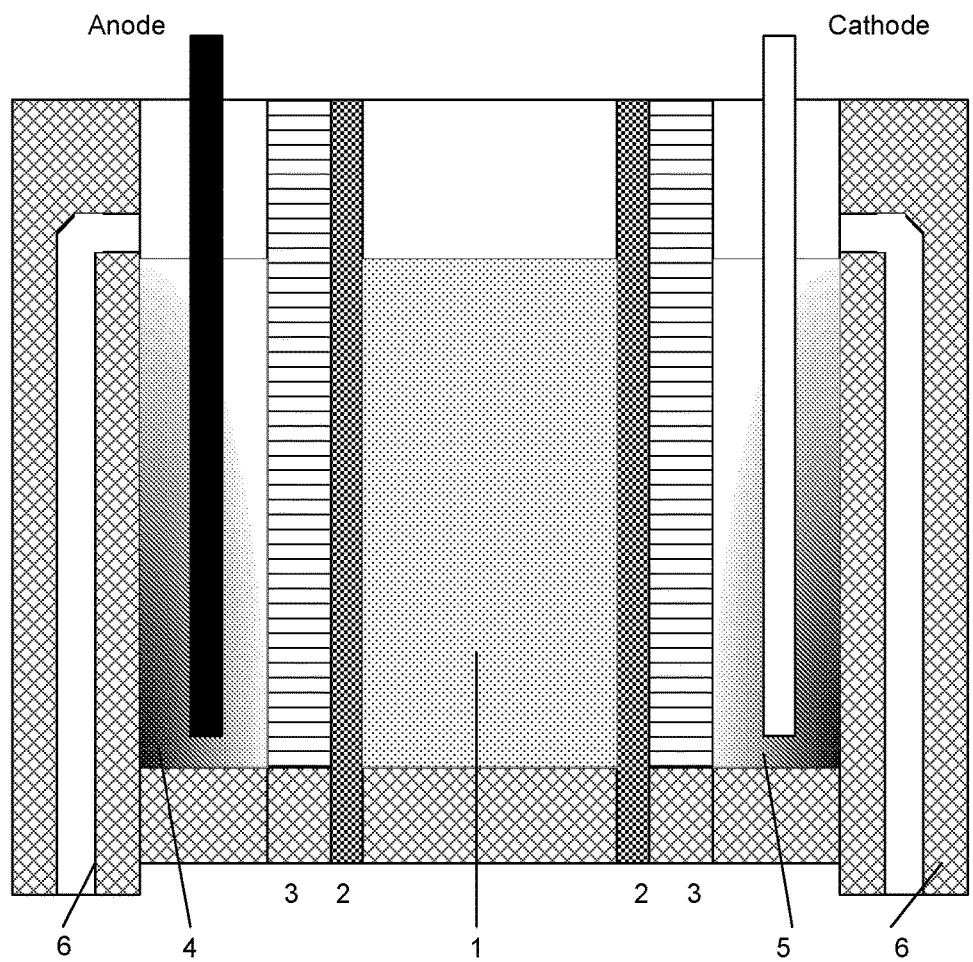
Fig. 10. 1 - the sample chamber (camera), 2 - membranes, 3 - perforated plates, 4 anode chamber (camera), 5 cathode chamber (camera), 6 - sides with water outlets.

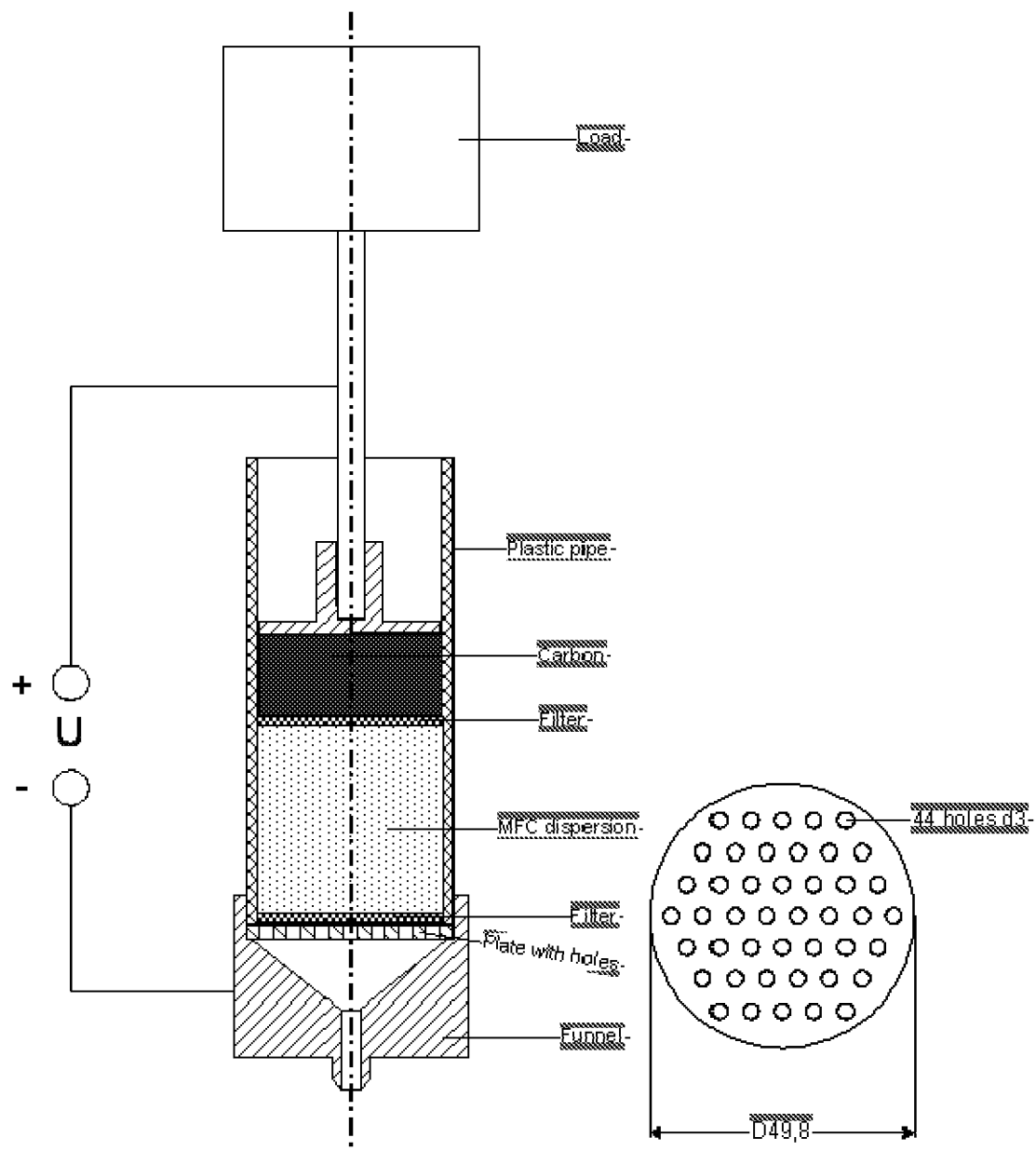
Figure 11. A dewatering setup scheme (left) and cathode plate with holes. Instead of a MFC dispersion a lignin dispersion was used in example 1.

METHOD OF PURIFYING LIGNIN BY SUBJECTING A SLURRY COMPRISING LIGNIN TO AN ELECTRIC FIELD

This application is a U.S. National Stage under 35 U.S.C. § 371 of International Application No. PCT/IB2015/057478, filed Sep. 30, 2015, which claims priority to Swedish patent application No. 1451174-5, filed Oct. 3, 2014.

FIELD OF INVENTION

The present invention relates to a process for purifying, such as salt/ion depletion, and/or ash reduction, and/or sulphur removal, and/or free sugar depletion and/or VOC depletion, or fractionating, preferably by using dewatering, of a slurry comprising a lignin or lignin derivative or a combination thereof. A lignin or lignin derivative obtainable from said process and uses thereof are also disclosed.

BACKGROUND

Lignin from forest biomasses or lignocellulosic material can be recovered and utilized as a valuable raw material for further conversion, modification or used as obtained in the native form. The first problem is to remove the lignin from lignocellulosic material. In the pulp kraft process, the lignin can be removed from the black liquor. The commercial LignoBoost process has shown to be efficient to produce a purified lignin. However, this product still contains ashes (inorganic compounds), ions, and organic material which can be detrimental for the intermediate or end product. For example, the ash content and hemicellulose content in lignin for carbon fiber production should preferably be as low as possible.

The commercial solution to remove and produce purified lignin from the kraft pulping process, also known as the LignoBoost method, disclosed in the US2008047674A (Lignin from Black Liquor). This publication discloses a method for separating lignin from black liquor comprising steps of precipitation with acid, dewatering, suspending, pH adjustment, and displacement washing and with final dewatering.

A modified version is disclosed in the US2008051566A (Lignin from a lignin containing liquid/slurry precipitation of lignin using small amounts of acid) which additionally contains a step of adding sulphate compounds or sulphate ions. Further publications demonstrates different variations of precipitating the lignin such as in the WO10143997A1 (METHOD FOR PRECIPITATING LIGNIN FROM BLACK LIQUOR BY UTILIZING WASTE GASES), WO12177198A1 (METHOD FOR LIGNIN SEPARATION FROM BLACK LIQUOR COMPRISING MULTIPLE ACIDIFICATION STEPS) and US2010041879A (METHOD FOR RECOVERING A LOW SODIUM CONTENT LIGNIN FUEL FROM BLACK LIQUOR).

The removal of lignin from the black liquor may be made with various methods, whereas the most common approach is to neutralize and precipitate lignin in combination with washing and dewatering steps. Repeating the steps can reduce the amount of ashes, ions and hemicellulose, but small amounts will be present and likely chemically bound to the lignin matrix. Repeated washing also decreases the yield, thus increasing costs. In particular, a low sulphur containing lignin is of high interest but difficult to obtain from a black liquor made with the kraft pulping process.

CN103709414A further discloses a method for preparing monodisperse liquid alkali lignin molecules and their applications whereby using alkali-soluble lignin, Shen silicon dioxide, calcium oxide impurity, nanofiltration purification, reverse osmosis enriched, catalytic cracking technology to produce liquid alkali lignin molecules of liquid.

In addition, WO2012156880 relates to a process for purifying, such as salt/ion depletion and/or free sugar depletion, preferably by using dewatering, a slurry comprising cellulose, such as microfibrillated cellulose, by subjecting the slurry to an electric field.

There is still a technical problem that is to remove the ash and ions, and especially sulphur, from lignin obtained from a black liquor process or a similar process or side stream. The acidification and subsequent washing and dewatering step, although repeated in one or several sequences, are not enough efficient to remove the last portion of ash and ions, which is necessary for producing a high quality purified lignin. For a high quality lignin, the ash content should be <1.0% and more preferably <0.5% when determined at 525° C.

Another requirement is that the process should be solvent free, although the application of the invention is not limited to this. A scalable and integrable low cost and solution that can be operated in batch or continuous mode cost efficiently is another pre-requisition.

There is thus a need for an improved process for purifying, such as salt/ion depletion, and/or ash reduction, and/or sulphur removal, and/or free sugar (including carbohydrate, polymeric sugars) depletion and/or VOC depletion, or fractionating, preferably by using dewatering, of a slurry comprising a lignin or lignin derivative or a combination thereof.

SUMMARY OF INVENTION

The present invention solves one or more of the above problems, by providing according to a first aspect a process for purifying, such as salt/ion depletion, and/or ash reduction, and/or sulphur removal, and/or free sugar depletion, and/or VOC (volatile organic compounds) depletion, or fractionating, preferably by using dewatering, of a slurry comprising a lignin or lignin derivative or a combination thereof, wherein the process comprises the following steps:
  a) providing a slurry comprising a lignin or lignin derivative or a combination thereof,
  b) subjecting the slurry to an electric field inducing the liquid and the polar, molecules, species or components thereof such as ions, of the slurry to flow, optionally combined with a pressure force and/or a suction force,
  c) separating the liquid from the lignin or lignin derivative or a fraction emanating from both said lignin species, thus obtaining a liquid depleted purified or fractionated lignin or lignin derivative or intermediate lignin product, optionally in slurry form.

The present invention also provides according to a second aspect a lignin or lignin derivative or an intermediate lignin product, dewatered according to the process of according to the first aspect.

The present invention also provides according to a third aspect, a lignin or lignin derivative or an intermediate lignin product, obtainable by the process according to the first aspect.

The present invention also provides according to a fourth aspect use of a lignin or lignin derivative or an intermediate lignin product, according to the second or third aspect for the production of heat, vanillin, ethyl vanillin, diphenols, as chemical feed stock, in carbon fibers, activated carbon, in conductive fibers or films, in pharmaceuticals, composites, electronics, food, carbonized lignin, adhesives, foams or complexing agents, or as a material in chemical synthesis.

It is preferred that an electric field with a voltage of 10-200 V is used, preferably 10-200 V. Increasing the voltage typically increases the water extraction rate. The optimal value is when the current intensity of the generated electric field and the voltage gradient are at maximum allowable levels.

Pressure, ultrasound, solvents, mixing and/or heat may also be applied to the slurry in order to further improve the purifying, such as salt/ion depletion, and/or ash reduction and/or sulphur removal and/or free sugar depletion and/or VOC depletion, of the slurry, preferably when using dewatering. The pressure may be applied after the electric field has been applied and the dewatering of the slurry has been started. This is due to that it may be preferred to increase the dry content of the slurry before pressure is applied. Another possibility is to have weak dewatering in E-field (electrical field) simultaneously as mechanical pressure is applied. However, it depends of course on the dry content of the slurry being treated.

DETAILED DESCRIPTION OF THE INVENTION

It is intended throughout the present description that the expression "lignin" embraces any lignin which may be used in the process according to the first aspect. The lignin may be milled wood-lignin, organosolv lignin, sulfite lignin, alkaline lignin, steam explosion lignin, acid-hydrolysed lignin, from various lignocellulosic materials. Preferably the lignin is an alkaline lignin. It may e.g. be a Kraft lignin. In addition to kraft lignin, other types of lignins may be purified with the said method such as native lignin, dioxane lignin or enzymatically liberated lignin. The lignin may preferably be obtained by using the process disclosed in EP 1794363. It is not limited to kraft lignin or liquor suspensions comprising lignin, but can of course include lignosulphonates (derived from kraft lignin, Soda AQ and sulphite pulping), lignin fraction obtained with ionic liquid or with solvent based processes, chemically modified lignin fractions, chemically activated lignin, enzyme treated lignin etc.

It is intended throughout the present description that the expression "free sugar" embraces not only sugars in monomeric forms but also smaller polymers such as polymeric sugar monomers. It embraces also free carbohydrates. It embraces also nanosize cellulosic particles.

Without bound to any theory, it is believed that this purification is enhancing the reactivity of lignin. It is also likely, that part of the lignin undergo oxidation during the EO treatment.

Preferred embodiments of the first aspect of the invention are apparent from the dependent claims and the subject matter thereof is further set out below.

According to a further preferred embodiment of the present invention the process according to the first aspect of the invention also comprises the following steps:
d) adding a washing liquid, such as an organic solvent or water or a combination thereof, and/or a pH controlling agent, such as $CO_2$, to the liquid depleted slurry or during dewatering,
e) subjecting the slurry of step d) to an electric field inducing the washing liquid of the slurry to flow, preferably involving a relatively fast increase of the current,
f) separating the washing liquid from the slurry, thus obtaining a purified lignin or lignin derivative or a fraction emanating from both said purified lignin or lignin derivative or intermediate lignin product, and
g) optionally repeating steps d)-f), preferably at least 3 times.

According to a further preferred embodiment the process according to the first aspect of the invention, the dewatering is done by electro-osmosis, preferably a pressure supported electro-osmosis (EO).

According to a further preferred embodiment the process according to the first aspect of the invention an electric field with a voltage of 10-200 V is used, preferably 10-100 V, whereby said voltage may be AC or DC, or a combination of both (alternately).

According to a further preferred embodiment of the process according to the first aspect of the invention pressure and/or suction and/or ultrasound and/or magnetic induced separation is also applied in order to dewater the slurry.

According to a further preferred embodiment of the process according to the first aspect of the invention the pressure is applied after the electric field has been applied and the dewatering has started.

According to a further preferred embodiment of the process according to the first aspect of the invention the pressure is a mechanical pressure.

According to a further preferred embodiment of the process according to the first aspect of the invention the dry content of the slurry comprising a lignin or lignin derivative or a combination, before dewatering, and/or salt/ion depletion and/or free sugar depletion, is about 1-50% by weight.

According to a further preferred embodiment of the process according to the first aspect of the invention the temperature of the slurry during the dewatering is above 30° C. and below 140° C., preferably above 30° C. and below 100° C.

According to a further preferred embodiment of the process according to the first aspect of the invention the slurry comprises nanoparticles, absorbents, salt, free sugars and/or surfactants which are stimulated by the electric field.

According to a further preferred embodiment of the process according to the first aspect of the present invention the washing liquid is water and/or an organic solvent, or a combination thereof.

According to a further preferred embodiment of the present invention the process according to the first aspect of the invention is followed by, or preceded by, a counter-ion change and/or one or more washing steps, such as acid or alkaline washing steps, and/or a filtration step, such as ultrafiltration step, and/or a fractionation step.

The dewatering may as said be done by the use of electro-osmosis. Electro-osmotic flow is often abbreviated EOF which is synonymous with electro-osmosis or electro-endosmosis. FFF (field flow fractionation) is also one further mode of fractionation or purification process in which electric field can be utilized. Electro-osmosis is the motion of polarizable species or molecules and liquid, such as water, induced by an applied potential or electric field across a porous material, capillary tube, membrane, wire, microchannel, or any other fluid conduit. The voltage generated by the electric field is preferably between 10-200 V, most preferred between 10-100 V.

The pressure may, as set out above, be a mechanical pressure being applied in any possible way. It is also possible to combine the treatment with the electric field with other kind of treatments in order to increase the dewatering and to e.g. optimize the purification or fractionation or to control e.g. clogging or rate of fouling. Examples of other treatments besides increasing the pressure are acoustic and vacuum based systems.

Using the electric field set out in the first aspect of the invention, in addition also reduces the number of bacteria as their cell walls will blow up. The process of the first aspect, as it removes ions, also removes ions and water also from microbes. This means that this ion removal and water removal will kill/have antimicrobial effect.

According to a further preferred embodiment of the present invention the process according to the first aspect of the invention may be followed by one or more modification steps, such as a counter-ion change as set out below.

As set out above the method according to the first aspect as set out in the present application may involve as set out above electro-osmosis or electrophoresis to remove ions from the dispersed lignin, according to a similar process disclosed in the publication WO2012156880A1 (PROCESS FOR TREATING MICROFIBRILLATED CELLULOSE AND MICROFIBRILLATED CELLULOSE TREATED ACCORDING TO THE PROCESS). It has been shown that the use of an electric field, in combination with the disclosed process conditions, will strongly improve the purification of lignin. This dewatering may also additionally also involve stimulation of other external sources such as mechanical, pressure or optical or magnetic field. One example is an ultrasound treatment. The purification may also be followed by any one or a combination thereof of the below methods to further dry the material.

The process as set out in the first aspect of the present invention may thus comprise the following steps: Preparation of lignin dispersion. The lignin may be used as received, i.e. if wet, or then dispersed in any lignin solvent or mixture such as ethanol, water. It is preferred that an aqueous based solvent is used. The dispersion of lignin may also contain an additive such as surfactants or other dispersant agents. The lignin may also be alkalized, enzyme treated or oxidized with electrical means before dewatered and purified.

The pH may be adjusted in order to make the process more efficient although the targeted pH value depends on the starting material. The pH may be adjusted with bases (NaOH, KOH, etc.) or acids ($H_2SO_4$, HCl, etc.) or with gases.

The temperature may be adjusted according to the process and product properties in order to control solubility and viscosity of the suspension. The temperature may also be varied within the dewatering and purification step.

The lignin suspension (slurry) may be placed between two electrodes after which a voltage is applied between the electrodes. It is preferred that an electric field with a voltage of 10-200 V is used (most preferred 10-100 V). Increasing the voltage typically increases the water or liquid removal rate.

Pressure and/or heat may also be applied to the lignin slurry in order to further improve the purifying. The pressure may be applied after the electric field has been applied and the dewatering of the slurry has been started. This is due to that it may be preferred to increase the dry content of the slurry before pressure is applied. Another possibility is to have weak dewatering in E-field simultaneously as mechanical pressure is applied. However, it depends of course on the dry content of the slurry being treated.

Simultaneous washing of the suspension may be made by adding fresh (clean) water or liquid (e.g. water and/or solvent) to the dewatered suspensions during the dewatering and purification step. The dewatering and purification step may be performed in one or several step.

One additional solution to upgrade lignin is filtration using ultrafiltration. This is used in the Lignoboost™ process set out above.

The field of application of such purified products as set out in the second and third aspect of the invention may be as end products or intermediate products, of which the latter is further converted. Examples of products from high purity lignin or upgraded lignin are carbon fibers, activated carbon, adhesives, functional additives in food or pharmaceuticals, complexing agents, fuel. The lignin can also be used utilized to make vanillin, ethyl vanillin, and diphenols. Also it may be used to make polyurethane or be used as polymeric building blocks. The monomeric lignin also has large variety of applications both as component in fuels or as a phenol when reacted over catalysts at appropriate conditions. Other examples of the converted monomeric lignin are e.g. benzene, toluene and xylene when made from the syngas [Integrated Forest Biorefineries. Challenges and opportunities, Lew P. Christopher, RSC Publishing, 2013]

Although the presence of sulphur may be advantageous in some applications, such as in fuel, because it reduces risks for corrosion caused by chlorides combined with potassium, there has been an interest to find a method that may reduce said sulphur from lignin and the present method addresses this issue. The lignin or lignin derivative of the second and third aspect may also be purified and then dewatered, pressed and pelletized in order to create a biofuel. The kraft lignin may also be used as a pellet.

It is important for a lignin to be used in carbon fibers, that it has a high purity which may be maintained by fractionation and solvent exchange processes, extensive acid washing, or by the use of membrane filtration prior to precipitation.

The lignin will also have benefits if purified when used as a co-reactant in phenol-formaldehyde resins and in materials such as polyurethanes, polyesters and epoxy resins. Lignin as a polyol component in polyurethanes has been known for a long time, but it has also been recognized that the reactivity in such application is important. The publications reveal further that the purification for such applications is of huge importance. It is also an interest to use polymerized lignin The process (method) according to the first aspect of the invention may be run batchwise or continuously.

The method according to the first aspect of the present invention may be used for lignin obtained from black liquor taken from the kraft pulping process, which is preferred. The lignin to be used in the method according to the first aspect of the present application may be used as such or as an intermediate or final product obtained from a purification process such as the Lignoboost™. The kraft lignin may be made from different raw materials which is obvious for the skilled person in the art.

Thus the present invention provides a method to purify lignin and to create a product thereof. Lignin obtained from kraft pulping and or biorefinery contains usually ashes, salts and organic materials that is difficult to remove with normal acid washing.

Preferred features of each aspect of the invention are as for each of the other aspects mutatis mutandis. The prior art documents mentioned herein are incorporated to the fullest extent permitted by law. The invention is further described in the following examples, together with the appended figures, the only purpose of which is to illustrate the invention and are in no way intended to limit the scope of the invention in any way.

FIGURES

FIG. 1 discloses the results of the experiment 1.

FIG. 2 discloses the anode filter (left) and the cakes anode side (right) in the experiment 1.

FIG. 3 discloses the cathode filter (left) and the cakes cathode side (right) in the experiment 1.

FIG. 4 discloses the results of the experiment 2.

FIG. 5 discloses the anode filter (left) and the cakes anode side (right) in the experiment 2.

FIG. 6 discloses the cathode side of the cake in the experiment 2.

FIG. 7 discloses the results of the experiment 3.

FIG. 8 discloses the anode filter (left) and the cakes anode side (right) in the experiment 3.

FIG. 9 discloses the cathode filter (left) and the cakes cathode side (right) in the experiment 3.

FIG. 10 discloses the cell of example 1.

FIG. 11 discloses a setup scheme (left) and cathode plate with holes. Instead of a MFC dispersion a lignin dispersion was used in example 1.

EXAMPLES

The lignin was obtained from a LignoBoost™ type of process and contained about 1.04% ash when determined at 550° C.

Experiment 1.

Dry lignin powder was ground in a mortar and 30 g of the powder was mixed with 30 ml of distilled water. After light shaking it was a liquid substance. 20 g of this mixture was placed into the dewatering cell, and the pressure was 650 Pa. Filter paper was used in the bottom. For the first 5 min. there was free dewatering monitored, no water emerged. At 5 min. moment 97 V voltage was applied, only very slow water outflow was present. The current was strong at the beginning, but it fell sharply after about 3 min. At 12.5 min. 20 ml of water was added over the anode, this was followed by the sharp increase of the electric current and very quick water outflow. Later water was added three times more, the outflow was very quick after each addition. The results are in FIG. 1. At 20 min. water vapor was emerging through the cathode. The experiment was ended after 22.5 min.; the sample of the water collected was taken. The mass of the cake was 16.2 g, the cake was with big cracks (FIG. 2, 3) and it was hard on the cathode side. The presence of the cracks in the cake was the cause of very quick water outflow after addition.

Experiment 2

The 3:5 mixture of the Lignin powder and water was prepared similarly as in experiment 1. To avoid crack formation the experiment was ended shortly after the current fell to low value. Water was not added. Only small amount of water was collected. The cake was soft on the anode side but hard and with cracks on the cathode side. The mass of the cake was about 19 g.

Experiment 3

The same mixture as in experiment 2 was used. The experiment was similar to the previous experiment, but the voltage was applied earlier and the experiment lasted longer. FIG. 7 shows that the water outflow ended after about 6 min.; again the content of the collected water was low. The waters collected in this experiment and in experiment 2 were mixed together to make one sample. The mass of the cake was about 17 g. The anode side of the cake was liquid, but a solid crust formed on the cathode side. The cake was without cracks and it is not clear why, while in experiment 3 it was with cracks.

TABLE 1

The setup of FIG. 11 was used.

| Sample | Dry solids content, DS (%) | Ash content at 550° C. (% in DS) | Ash content at 925° C. (% in DS) |
|---|---|---|---|
| Reference lignin | 63.0 | 1.04 | 0.96 |
| Exp. 1 | 66.2 | 0.15 | 0.12 |
| Exp. 2 | 55.8 | 0.30 | 0.29 |
| Exp. 3 | 59.3 | 0.20 | 0.19 |

Example 1

A cell was designed to be used in the process according to the first aspect of the invention and is explained in FIG. 10 (c.f. literature [1, 2]).

Before an experiment the chamber (camera) 1 was to be filled with the material to be investigated, and the chambers (cameras) and 5 filled with water. During the experiment water was to flow into one of the chamber (cameras) 4 or 5 and was to be collected for analysis. Lost water could be refilled adding it into either of cameras, according to the plan and the results of the experiment.

During an experiment free ions were to be extracted by the electric field into the cathode or the anode cameras and would be carried away by flowing water. The possible reactions at the electrodes products would also be also carried out by water and would not contaminate the material investigated.

The crust formation as in the case of Lignin powder may be avoided by maintaining temperature low enough by a sufficient water flow in the electrode cameras.

Tests were done whereby the cell disclosed in FIG. 10 was compared with the setup given in FIG. 11.

The cell of FIG. 10 gave the following results:
  a. monovalent, divalent, multivalent cations, and anions removed
  b. major change in s-content The setup of FIG. 11 gave the following results:
  c. one sided dewatering (normally monovalent, divalent and/or multivalent cations removed)
  d. no major change in S-content An estimate done regarding sulphur (S) reduction is summarized below:
  reference lignin—about 0.24% S
  washed lignin—about 0.012% S
    a reduction of about 95% (with the method of FIG. 11 the reduction was close to 0%)

In table 2 and 3 results are given from the FIG. 10 device and FIG. 11 device respectively.

TABLE 2

FIG. 10 device. Removal of ash.

| Sample | Dry solids content, DS (%) | Ash content at 550° C. (% in DS) | Ash content at 925° C. (% in DS) |
|---|---|---|---|
| Lignin Powder original | 83.3 | 1.11 | No data |

TABLE 2-continued

FIG. 10 device. Removal of ash.

| Sample | Dry solids content, DS (%) | Ash content at 550° C. (% in DS) | Ash content at 925° C. (% in DS) |
|---|---|---|---|
| Lignin powder Exp. LP14 | 67.3 | 0.11 | No data |

TABLE 3

FIG. 11 device. Removal of ash. The figures also appears in table 1.

| Sample | Dry solids content, DS (%) | Ash content at 550° C. (% in DS) | Ash content at 925° C. (% in DS) |
|---|---|---|---|
| Reference lignin | 63.0 | 1.04 | 0.96 |
| Exp. 1 | 66.2 | 0.15 | 0.12 |
| Exp. 2 | 55.8 | 0.30 | 0.29 |
| Exp. 3 | 59.3 | 0.20 | 0.19 |

In table 4 specific elements are given:

TABLE 4

Elements.

| Elements** mg/kg, on dry basis for ash | | | FIG. 11. setup | Washing with FIG. 10 setup |
|---|---|---|---|---|
| Limit of quantification (LOQ) | Theoretical, based on the 0.5% | mg/kg in DS | 56 | 6 |
| Na | Calculated, EDXA of the TGA residue | mg/kg in DS | 2480 | 130 |
| Mg | Calculated, EDXA of the TGA residue | mg/kg in DS | 20* | 0* |
| Al | Calculated, EDXA of the TGA residue | mg/kg in DS | 170 | 50 |
| Si | Calculated, EDXA of the TGA residue | mg/kg in DS | 260 | 170 |
| P | Calculated, EDXA of the TGA residue | mg/kg in DS | 10* | 0* |
| S | Calculated, EDXA of the TGA residue | mg/kg in DS | 2380 | 120 |
| K | Calculated, EDXA of the TGA residue | mg/kg in DS | 1110 | 70 |
| Ca | Calculated, EDXA of the TGA residue | mg/kg in DS | 80 | 10 |
| Ti | Calculated, EDXA of the TGA residue | mg/kg in DS | 0* | 0* |
| Mn | Calculated, EDXA of the TGA residue | mg/kg in DS | 30* | 10 |
| Fe | Calculated, EDXA of the TGA residue | mg/kg in DS | 70 | 40 |

**The values correspond only to elements (or elemental fraction) that are not volatilized during the combustion at 550° C..
The values below the LOQ are marked with*

1. R. Hofmann, T. Käppler, C. Posten. Electrofiltration of Biomaterials. Biomaterials, DOI: 10.1007/978-0-387-79374-0_6.
2. G. Gözke, C. Posten. Electrofiltration of Biopolymers. Food Eng Rev (2010) 2:131-146. DOI 10.1007/s12393-010-9016-2.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for removing sulphur from an initial purified lignin or lignin derivative or a combination thereof, wherein the process comprises the following steps:
    a) providing a slurry comprising the initial purified lignin or lignin derivative or the combination thereof, the initial purified lignin or lignin derivative or the combination thereof having an initial sulphur content,
    b) subjecting the slurry to an electric field inducing the liquid and polar molecules, species or components thereof, of the slurry to flow dewatering the slurry, the electric field formed by a cell comprising an anode and a cathode, and
    c) removing the liquid that flows from the initial purified lignin or lignin derivative or a fraction emanating from both said lignin species on an anode side and a cathode side of the cell to obtain a liquid depleted lignin or lignin derivative or intermediate lignin product having a sulphur content less than the initial sulphur content, optionally in slurry form.

2. The process according to claim 1 also comprising the following steps:
    d) adding a washing liquid comprising an organic solvent or water or a combination thereof, and/or a pH controlling agent comprising $CO_2$, to the liquid depleted slurry or during dewatering,
    e) subjecting the slurry of step d) to the electric field inducing the washing liquid of the slurry to flow, preferably involving a relatively fast increase of the current, and
    f) removing the washing liquid that flows from the slurry to obtain a purified lignin or lignin derivative or a fraction emanating from both said purified lignin or lignin derivative or intermediate lignin product.

3. The process according to claim 2 wherein the washing liquid is water and/or an organic solvent, or a combination thereof.

4. The process according to claim 2 wherein steps d)-f) are repeated at least 3 times.

5. The process according to claim 1 wherein the dewatering is done by electro-osmosis.

6. The process according to claim 1 wherein an electric field with a voltage of 10-200 V is used, whereby said voltage may be AC or DC or a combination of both.

7. The process according to claim 1 wherein pressure and/or suction and/or ultrasound and/or magnetic induced separation also is applied in order to dewater the slurry.

8. The process according to claim 7 wherein the pressure is applied after the electric field has been applied and the dewatering has started.

9. The process according to claim 7 wherein the pressure is a mechanical pressure.

10. The process according to claim 1 wherein the dry content of the slurry comprising the initial purified lignin or lignin derivative or the combination, before dewatering, and/or salt/ion depletion and/or free sugar depletion, is about 1-50% by weight.

11. The process according to claim 1 wherein the temperature of the slurry during the dewatering is above 30° C. and below 140° C.

12. The process according to claim 1 wherein the slurry comprises nanoparticles, absorbents, salt, free sugars and/or surfactants which are stimulated by the electric field.

13. The process according to claim 1 followed by, or preceded by, a counter-ion change and/or one or more washing steps, such as acid or alkaline washing steps, and/or a filtration step, such as ultrafiltration step, and/or a fractionation step.

14. The process according to claim 1 wherein step b) is performed in combination with a pressure force and/or a suction force.

15. The process according to claim 1 wherein an electric field with a voltage of 10-100 V is used, whereby said voltage may be AC or DC or a combination of both.

16. The process according to claim 1 wherein the temperature of the slurry during the dewatering is above 30° C. and below 100° C.

17. The process according to claim 1 wherein providing the slurry comprises dispersing the initial purified lignin or lignin derivative or the combination thereof in a lignin solvent.

18. The process according to claim 1 wherein a reduction in sulphur content is about 95%.

19. A lignin or lignin derivative or an intermediate lignin product, dewatered according to the process of claim 1.

20. A lignin or lignin derivative or an intermediate lignin product, obtainable by the process according to claim 1.

* * * * *